(12) United States Patent
Ries et al.

(10) Patent No.: US 11,754,398 B2
(45) Date of Patent: Sep. 12, 2023

(54) METHOD FOR DETERMINING MEASURED VALUES BY MEANS OF AT LEAST TWO DIFFERENT MEASURING METHODS AND USE THEREOF

(71) Applicant: DAIMLER AG, Stuttgart (DE)

(72) Inventors: Florian Ries, Stuttgart (DE); Frank Schuster, Böblingen (DE); Martin Haueis, Gärtringen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 137 days.

(21) Appl. No.: 17/609,127

(22) PCT Filed: Apr. 22, 2020

(86) PCT No.: PCT/EP2020/061243
§ 371 (c)(1),
(2) Date: Nov. 5, 2021

(87) PCT Pub. No.: WO2020/224971
PCT Pub. Date: Nov. 12, 2020

(65) Prior Publication Data
US 2022/0221278 A1 Jul. 14, 2022

(30) Foreign Application Priority Data
May 8, 2019 (DE) ..................... 10 2019 003 246.2

(51) Int. Cl.
*G01C 21/00* (2006.01)
*B60W 60/00* (2020.01)
(Continued)

(52) U.S. Cl.
CPC ......... *G01C 21/005* (2013.01); *B60W 60/001* (2020.02); *G01S 19/48* (2013.01); *G05D 1/0055* (2013.01)

(58) Field of Classification Search
CPC .......... G01S 19/45; G01S 19/48; G01S 13/86; G01S 5/02; G01D 1/16; G01D 1/00; B60W 50/00; G01C 21/00
See application file for complete search history.

(56) References Cited

U.S. PATENT DOCUMENTS 6,999,906 B2 2/2006 Koehler et al.
11,187,793 B1* 11/2021 Liu ...................... G05D 1/0088
(Continued)

FOREIGN PATENT DOCUMENTS

DE         10135586 A1     2/2003
DE   102016009117 A1     2/2017
(Continued)

OTHER PUBLICATIONS

International Search Report dated Jul. 23, 2020 in related/corresponding International Application No. PCT/EP2020/061243.
(Continued)

*Primary Examiner* — Tan Q Nguyen
(74) *Attorney, Agent, or Firm* — PATENT PORTFOLIO BUILDERS PLLC

(57) ABSTRACT

A method for determining measured values using at least two different measuring methods involves, with each of the measuring methods, determining provisional measured values and suppling data for an integrity of the determined provisional measured values. The determined provisional measured values are merged to give combined measured values and information on the integrity of the combined measured values is determined. Depending on the data concerning the integrity of the determined provisional measured values and the combined measured values and depending on a period of time during which the determined provisional measured values and the combined measured values in each case meet specified requirements regarding (Continued)

Figure 1:
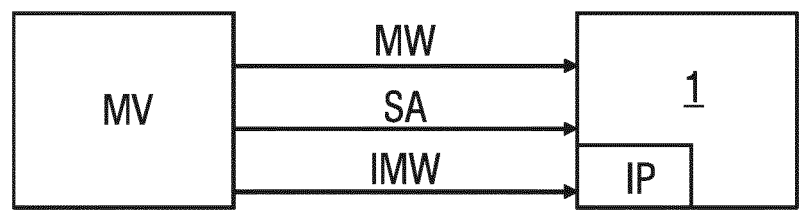

their integrity, it is decided which of the measured values are supplied for further processing.

19 Claims, 6 Drawing Sheets

(51) Int. Cl.
*G01S 19/48* (2010.01)
*G05D 1/00* (2006.01)
*G01S 5/02* (2010.01)

(56) References Cited

U.S. PATENT DOCUMENTS

| | | | | |
|---|---|---|---|---|
| 2018/0068206 | A1* | 3/2018 | Pollach | G06V 20/56 |
| 2018/0113474 | A1* | 4/2018 | Koda | G05D 1/0274 |
| 2019/0064799 | A1* | 2/2019 | Amirloo Abolfathi | G07C 5/0808 |
| 2020/0174112 | A1* | 6/2020 | Xing | G01S 7/417 |
| 2021/0215503 | A1 | 7/2021 | Ries et al. | |

FOREIGN PATENT DOCUMENTS

| | | |
|---|---|---|
| DE | 102018004229 A1 | 11/2019 |
| WO | 2019037226 A1 | 2/2019 |
| WO | 2019223931 A1 | 11/2019 |

OTHER PUBLICATIONS

Office Action dated Apr. 21, 2020 in related/corresponding DE Application No. 10 2019 003 246.2.
Written Opinion dated Jul. 23, 2020 in related/corresponding International Application No. PCT/EP2020/061243.

* cited by examiner

METHOD FOR DETERMINING MEASURED VALUES BY MEANS OF AT LEAST TWO DIFFERENT MEASURING METHODS AND USE THEREOF

BACKGROUND AND SUMMARY OF THE INVENTION

Exemplary embodiments of the invention relate to a method for determining measured values by means of at least two different measuring methods and use thereof.

DE 10 2016 009 117 A1 discloses a method for localization of a vehicle in which environment detection-based localization and localization by means of a global navigation satellite system are merged together.

DE 10 2018 004 229.5 describes a method for controlling a vehicle system of a vehicle, configured for implementing automated driving, and a device for implementing the method. In the method, the vehicle is located with at least two different localization methods, wherein the at least two localization methods comprise at least one landmark-based localization method and a localization method based on at least one global navigation satellite system. The vehicle system is released for activation as a function of a result of the localization. Moreover, the vehicle system is only released for activation if it is confirmed with each of the localization methods employed that the vehicle is located on a route section released for automated driving.

Exemplary embodiments of the invention are directed to an improved method, relative to the prior art, for determining measured values by means of at least two different measuring methods, and use of this method.

In a method for determining measured values by means of at least two different measuring methods, provisional measured values are determined according to the invention with each of the measuring methods and data are provided concerning the integrity of the provisional measured values determined. The integrity is in this case, in particular, a measure of quality, which shows how reliable the respective measured value is. The provisional measured values determined are merged to give combined measured values and information about the integrity of the combined measured values is determined. Depending on the data concerning the integrity of the provisional measured values determined and the combined measured values and depending on a period of time during which the provisional measured values determined and the combined measured values in each case meet specified requirements regarding their integrity, it is decided which of the measured values are made available for further processing. Advantageously, depending on the decision made, either the combined measured values are supplied for further processing, or one of the measuring methods is selected and the provisional measured values of the selected measuring method determined are supplied for further processing.

The method makes it possible to increase the availability of the measured values for further processing, because by means of this method, not only the combined measured values, but, if the aforementioned requirements are fulfilled, also the provisional measured values determined are supplied for further processing.

The method is useable in particular in a vehicle, in particular for carrying out automated or autonomous driving of the vehicle and/or for controlling a vehicle system of the vehicle configured for carrying out automated or autonomous driving. Due to the improved availability of the measured values as a result of the method, the availability of the automated or autonomous driving is also increased, i.e., a larger proportion of the driving of the vehicle can be performed as automated or autonomous driving. The measuring methods then relate in particular to methods for localization of the vehicle, i.e., in particular for determining a respective position of the vehicle, as the localization is necessary for carrying out automated or autonomous driving. In a possible embodiment of the method, the measuring methods therefore comprise, for example, a landmark-based measuring method and a satellite-supported measuring method, in particular based on at least one global navigation satellite system.

In a further possible embodiment of the method, the measuring methods comprise, for example, at least two different measuring methods for object recognition and/or distance determination, in particular at least one radar-based measuring method and/or at least one lidar-based measuring method and/or at least one camera-based measuring method, alternatively or in addition to the aforementioned landmark-based measuring method and satellite-supported measuring method, in particular based on at least one global navigation satellite system. This embodiment of the method is in particular also suitable for use in the vehicle, to increase the availability of corresponding functions of the vehicle based on this measuring method, i.e., their usage time can be increased by means of the method.

For example, a period of time of preparation for further processing of the respective measured values is detected. Advantageously, the period of time for preparation for further processing of the respective measured values is limited. This ensures that an error rate, in particular a false-positive error rate of the measured values supplied for further processing, on the whole does not exceed a preset value. The false-positive error occurs if according to the data on integrity, the relevant measured value should be good, but that is not so.

In a possible embodiment of the method, it is decided for a majority of further processing devices in each case, as a function of the data concerning the integrity of the provisional measured values determined and the combined measured values and depending on the period of time during which the provisional measured values determined and the combined measured values in each case meet specified requirements regarding their integrity, which of the measured values are supplied for the respective further processing. Accordingly, the specifications regarding the data concerning the integrity of the provisional measured values determined and the combined measured values, the specifications for the period of time during which the provisional measured values determined and the combined measured values must in each case meet specified requirements regarding their integrity, and the specifications regarding these requirements that are to be fulfilled are adapted to the respective further processing device and respective requirements thereof, so that possibly for some of these further processing devices, which impose lower specifications regarding these quantities relating to the measured values, measured values can still be made available for further processing, whereas for other further processing devices with higher specifications, no measured values can be made available. Therefore, instead of a uniform availability of the functions of all further processing devices, it is achieved that the availability of functions of some further processing devices, which impose lower specifications, can be increased further.

BRIEF DESCRIPTION OF THE DRAWING FIGURES

Embodiment examples of the invention are explained in more detail hereunder, on the basis of drawings.

Figure 2:
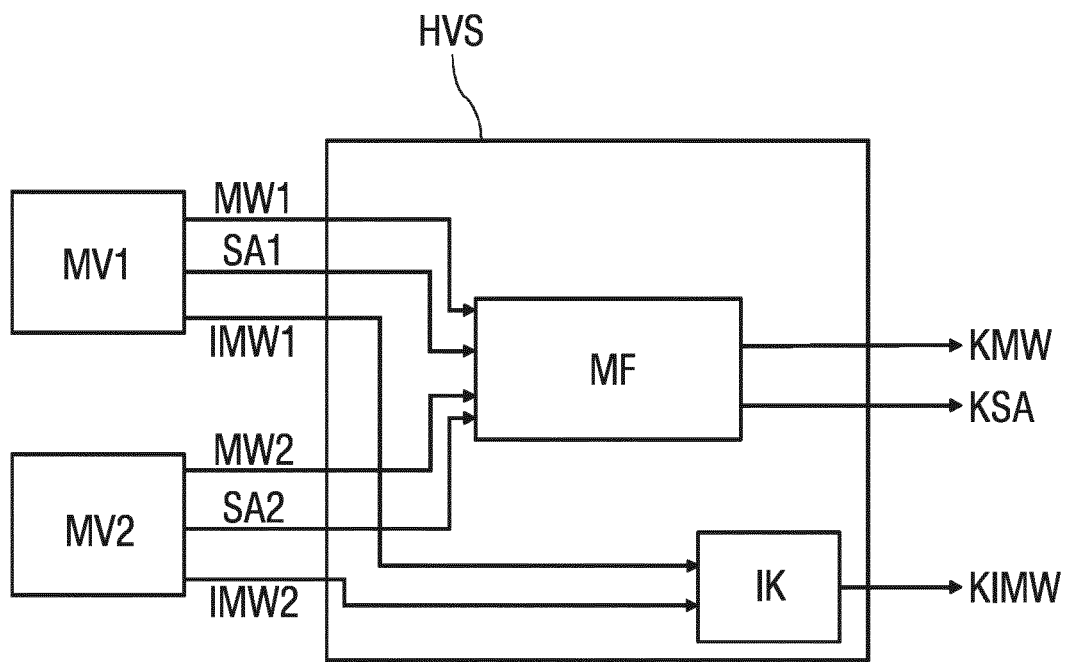
Figure 3:
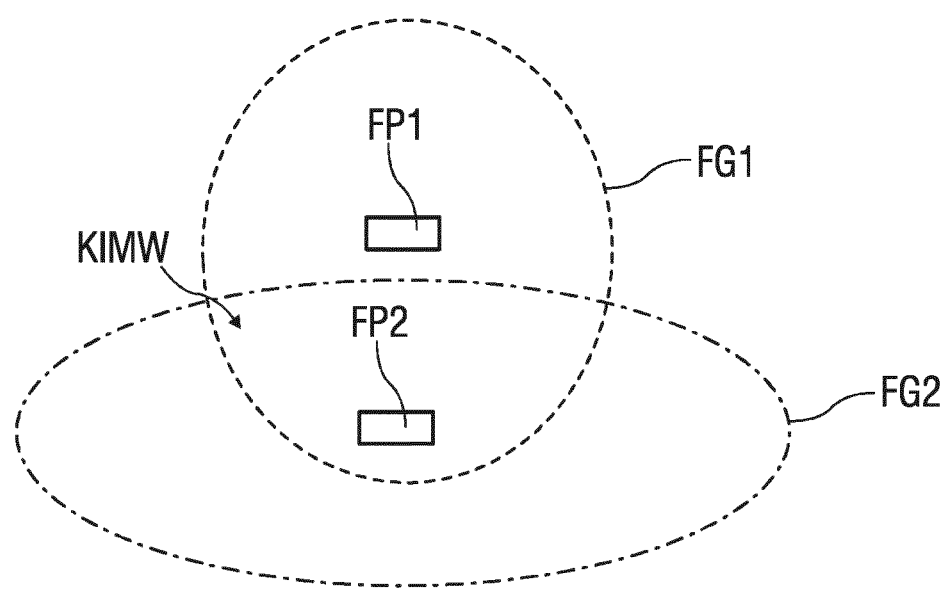
Figure 4:
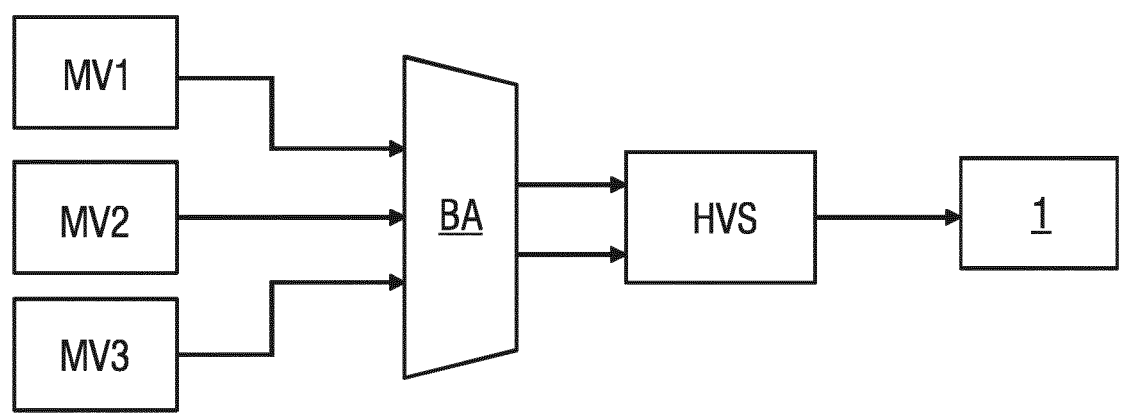
Figure 5:
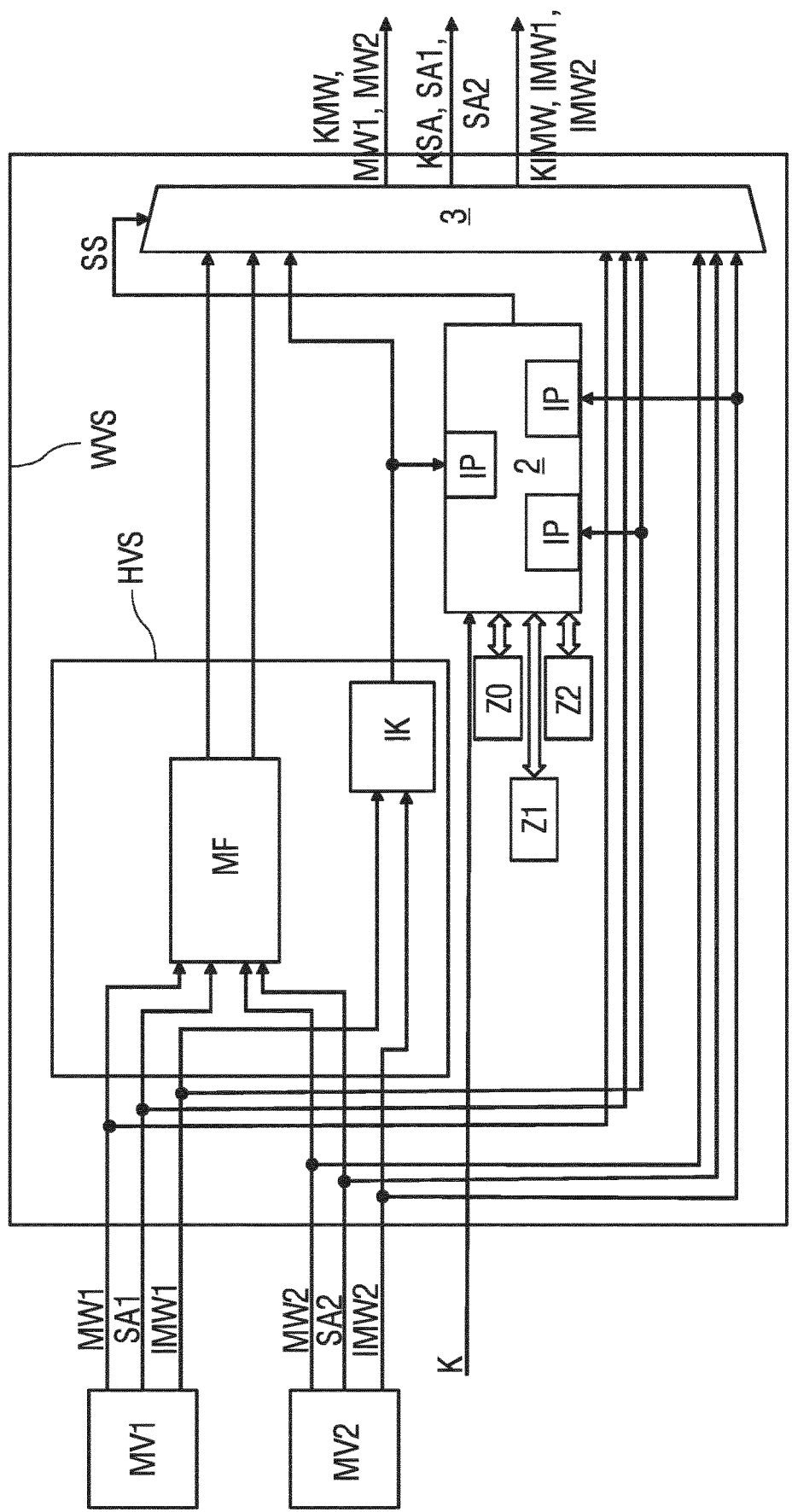
Figure 6:
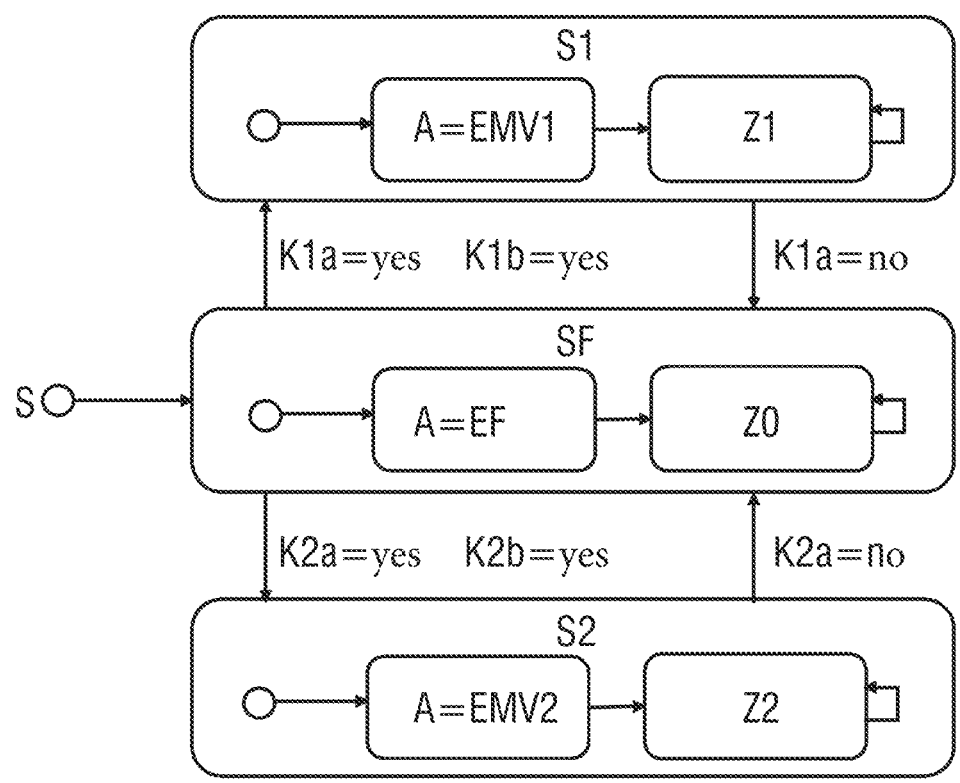
Figure 7:
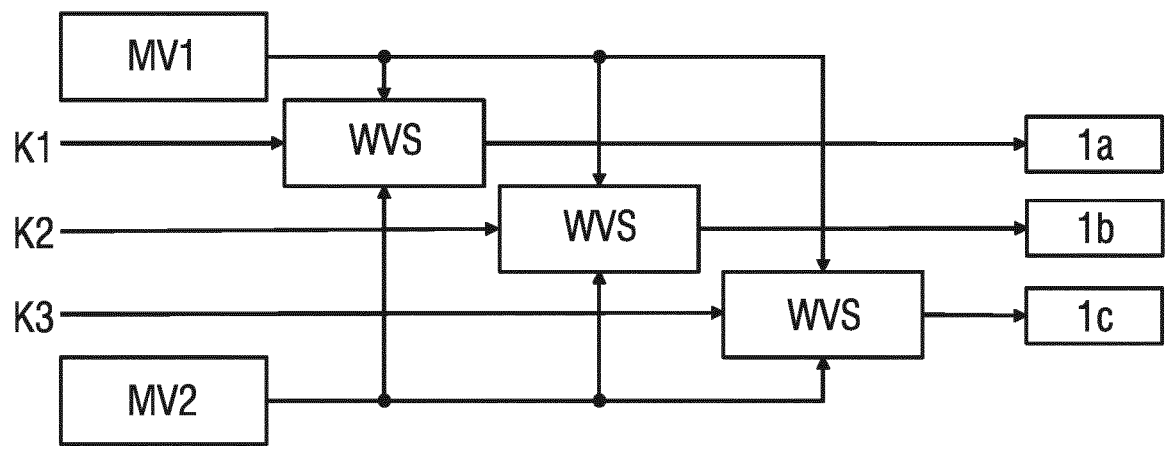
Figure 8:
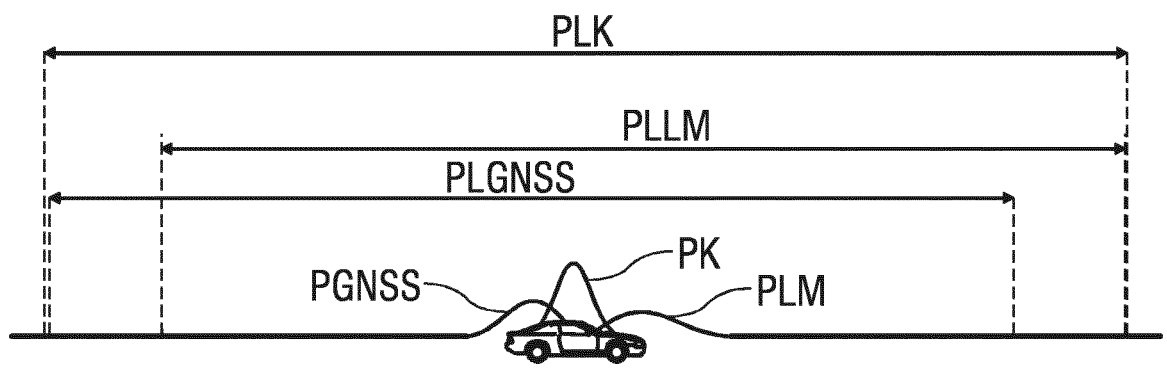
Figure 9:
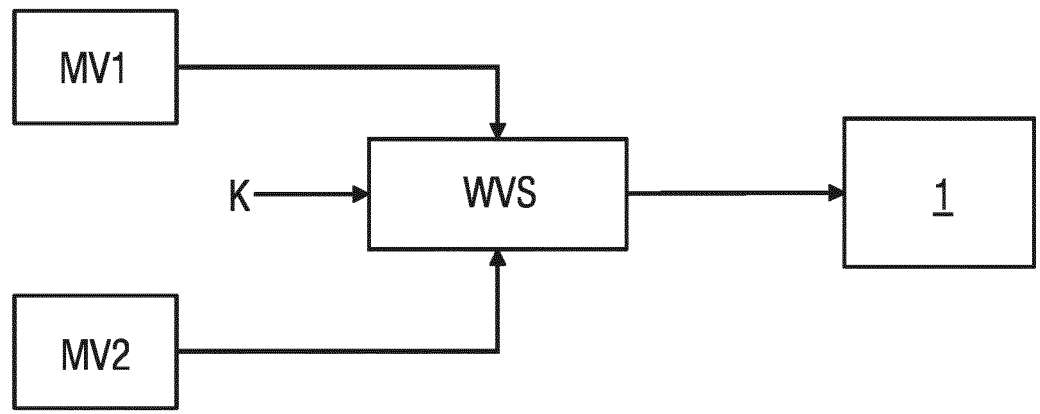
Figure 10:
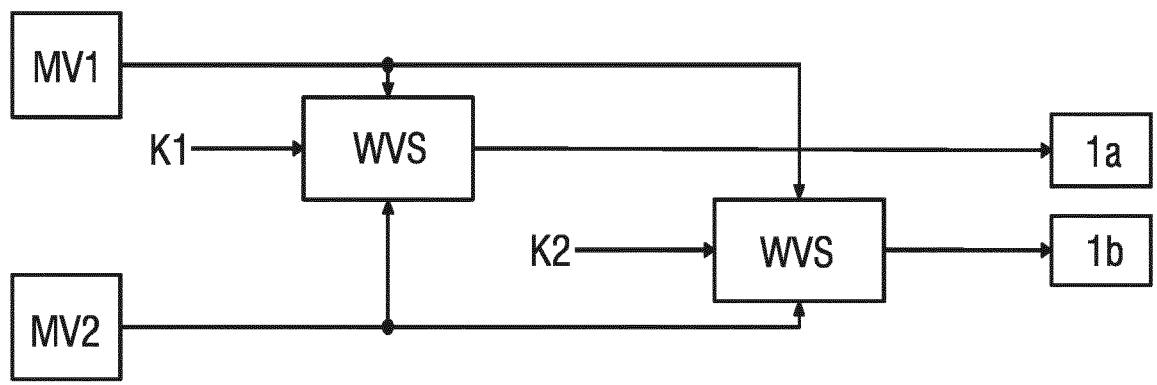

These show:

FIG. 1 schematically, an individual measuring method and a further processing device for further processing of measured values supplied by this measuring method, FIG. 2 schematically, a procedure permissible according to standard ISO26262, FIG. 3 schematically, a presentation of results of two different measuring methods and a combined result, FIG. 4 schematically, a best selection from three measuring methods, FIG. 5 schematically, a method for determining measured values by means of at least two different measuring methods, FIG. 6 schematically, a status of provision of the results of the respective measuring methods or the merged results, FIG. 7 schematically, a further embodiment of the method for determining measured values by means of at least two different measuring methods, FIG. 8 schematically, vehicle positions and error upper limits determined by means of two measuring methods, FIG. 9 schematically, the method for determining measured values by means of at least two different measuring methods for the example of vehicle localization, and FIG. 10 schematically, the method for determining measured values by means of at least two different measuring methods for the example of vehicle localization and an additional comfort function.

Parts that are equivalent to one another are given the same reference symbol in all the figures.

DETAILED DESCRIPTION

Referring to FIGS. 1 to 10, in the following a method for determining measured values MW1, MW2, KMW by means of at least two different measuring methods MV1, MV2 is explained, for example by means of a satellite-supported and a landmark-based measuring method for vehicle localization or by means of a radar-based, lidar-based and/or camera-based measuring method for object recognition or distance determination.

Each of the measuring methods MV1, MV2 supplies provisional measured values MW1, MW2 and integrity data, i.e., data concerning the integrity IMW1, IMW2 of the provisional measured values MW1, MW2 supplied. The integrity IMW1, IMW2 is a measure of quality, which shows how reliable a measured value MW1, MW2 is.

The provisional measured values MW1, MW2 are merged to give combined measured values KMW, and combined integrity data are determined, i.e., information concerning the integrity KIMW of the combined measured values KMW is determined.

Depending on the data concerning the integrity IMW1, IMW2, KIMW of the measured values MW1, MW2, KMW and depending on the period of time during which the measured values MW1, MW2, KMW in each case fulfil specified requirements regarding their integrity IMW1, IMW2, KIMW, it is decided which of the measured values MW1, MW2, KMW should be supplied for further processing. Depending on this decision, therefore either the combined measured values KMW are supplied for further processing or one of the measuring methods MV1, MV2 is selected and the provisional measured values MW1, MW2 of the selected measuring methods MV1, MV2 are supplied for further processing.

This method is suitable in particular for safety-critical systems, as these have high requirements on the upstream measuring function, both with respect to functional safety and safety in use. Often the measuring function must, in addition to the measured quantity and statistical estimation of accuracy (standard deviation), also provide an indication that the measured quantity is within a defined standard range (integrity). This is in particular the case if more complex error profiles may occur, which go beyond pure interference noise. As an embodiment example, in the following a position determination with integrity is explained for highly automated driving, i.e., for automated, in particular highly automated, or autonomous driving.

Standard ISO26262 is known from the prior art; this permits decomposition of a critical measuring function into two heterogeneous partial components, which estimate the measured quantity and metadata redundantly, independently of one another. The functional safety requirements for each partial component are then clearly lower in each case. The safety in use also benefits from this, for if the integrity indicators are transformed to "AND", i.e., a combined integrity indicator is formed, then this combined integrity indicator has a far lower false-positive error rate than the individual components (the false-positive error arises if according to the data on integrity, the relevant measured value would have to be good, but this is not so). This procedure is widely used in practice, as the two partial components can generally be configured much more favorably than a particular solution that creates the same requirements. There is, however, the drawback that as a result of this transformation to "AND", the availability of the measuring function decreases, which often results in limitations that are perceptible for a user.

This drawback is avoided by the method described here. Moreover, this method advantageously represents a system expansion, which, in contrast to the decomposition described above and carried out up till now, makes a "soft" decomposition of the measuring function possible, as the method described here allows the output of variants of the measured quantity and metadata with various levels of validation.

As already described above, the period of time or, especially when using the method in vehicles for example alternatively or additionally a stretch of road is measured, for example from the beginning of an operating cycle, for example from the start of the ignition cycle, the two partial components, i.e., the two measuring methods MV1, MV2, were available. The false-positive error rate of the integrity indication transformed to "AND" is meanwhile very small. Then, in the manner described above, in particular corresponding to one metric, in one variant of the measurement output the temporary bridging of the unavailability of one the partial components, i.e., of one of the measuring methods MV1, MV2, is permitted, where the other, the available, partial component, i.e., that corresponding to other measuring methods MV2, MV1, directly fulfils the measurement output. This bridging time and/or bridging stretch, i.e., the period of time and/or stretch of road for preparation of the respective measured values MW1, MW2 for further processing, is also advantageously measured and is limited according to the metric.

The method has the advantage that, if a system-related consumer of the measured quantity, i.e., a further processing device 1, can cope with a higher false-positive error rate than is produced by the hard transformation to "AND" described above than in the procedure applied up to now, then the availability of the measured quantity may in this way be increased for this consumer. It then receives the variant of the measured quantity that corresponds exactly to its false-positive error rate requirement, with the maximum availability possible for this.

Various consumers, i.e., various further processing devices 1a, 1b, 1 c, with different false-positive error rate requirements, may then be supplied with measured values MW1, MW2, KMW in parallel. This results in a greater availability of all downstream system parts, including functions that can be experienced by the user. In the embodiment example of the automated or autonomous driving function, their availability is thus increased, i.e., the user, here a driver or occupant of the vehicle, experiences a greater availability, i.e., a higher possible usage time of the automated or autonomous driving function. The guidelines of ISO26262 are still respected.

After this basic explanation of the method described here and of the existing procedure, first the existing procedure, then the method described here and then the embodiment example for the automated or autonomous driving function are explained in more detail hereunder on the basis of FIGS. 1 to 10.

FIG. 1 shows an individual measuring method MV and a safety-critical system as consumer and further processing device 1 for the further processing of the measured values MW supplied by this measuring method MV.

The problem to be solved by the method described here is that these safety-critical systems, for example a vehicle system for executing automated or autonomous driving, have high requirements on their measuring methods MV, regarding both functional safety and safety in use. Additional data concerning the integrity IMW of the measured values MW are often required, for example regarding a maximum error, a quality, a validity and/or an inaccuracy. Therefore, an integrity test IP takes place, i.e., a test of whether the data regarding the integrity IMW of the measured values MW are adequate. If these data regarding the integrity IMW are not adequate, for example because a quality rating is at a low level and an error upper limit, also designated as Protection Limit, is too high, the safety-critical system changes to a safer state, for example there is deactivation, and the user is informed or warned. This impairs the user experience. Therefore, a high availability of the integrity IMW is desired. An acceptable false-positive error rate of data regarding the integrity IMW is as a rule very low and requires expensive error recognition mechanisms.

Most of the measuring methods MV also supply, as shown in FIG. 1, a standard deviation SA of the measured values MW, although this generally only relates to a residual value of a linear or linearized optimization. An integrity cannot be derived from this, and with more complex error states than simple noise it is a poor measure of quality. It may, for example, still be used to quantify the noise for the purpose of the merging of provisional measured values MW1, MW2 of various measuring methods MV1, MV2 as described hereunder, in particular so long as other mechanisms assess the integrity of the data.

The aforementioned standard on functional safety ISO 26262 allows, as shown in FIG. 2, the decomposition, i.e., breaking down, of a measuring method MV into two partial components, i.e., into two different measuring methods MV1, MV2, which both, independently of one another, measure with different input data and methods, and in each case supply provisional measured values MW1, MW2, data concerning the integrity IMW1, IMW2 of the provisional measured values MW1, MW2 and a respective standard deviation SA1, SA2. In relation to functional safety, it helps to avoid high ASIL measurement functions, as the partial components, i.e., the two different measuring methods MV1, MV2 can monitor each other (ASIL=Automotive Safety Integrity Level, safety requirement stage specified by ISO 26262 for safety-relevant systems in motor vehicles).

Similarly, false-positive integrity assessments can be greatly reduced by an integrity combination IK of the data concerning the integrity IMW1, IMW2 of the provisional measured values MW1, MW2, for example by an AND operation of valid identifiers, i.e., so-called flags, and/or a standardization of the error upper limits. Therefore, the individual partial components, i.e., the two different measuring methods MV1, MV2, can make more false-positive errors in their data concerning the integrity IMW1, IMW2 and require less expensive error recognition and exclusion mechanisms. Often this decomposed solution is more economical than a very robust individual component, i.e., than a very robust individual measuring method MV, with a high ASIL value. As a result, this procedure is widely used.

FIG. 2 shows a schematic representation of this procedure that is permissible according to ISO 26262. The two different measuring methods MV1, MV2 supply in each case provisional measured values MW1, MW2, data concerning the integrity IMW1, IMW2 of the provisional measured values MW1, MW2 and a respective standard deviation SA1, SA2. This takes place, for example, by means of an estimation algorithm. The data concerning the integrity IMW1, IMW2 of the provisional measured values MW1, MW2 comprise, for example, the error upper limit or a valid identifier, i.e., valid flag, and therefore a guaranteed upper limit of the error of the respective provisional measured value MW1, MW2.

In a linking step, as demarcation for the procedure described in more detail hereunder based on the mandatory linking here of the two measuring methods MV1, MV2, designated hereinafter as hard linking step HVS, a measured value fusion MF, i.e., the provisional measured values MW1, MW2 supplied by the two different measuring methods MV1, MV2 are merged into combined measured values KMW with a combined standard deviation KSA. The combined measured value KMW is for example a weighted mean value, weighted for example according to standard deviation SA1, SA2. The integrity combination IK of the data concerning the integrity IMW1, IMW2 of the provisional measured values MW1, MW2 supplies information on the integrity KIMW of the combined measured values KMW, for example a union of sets of the two error upper limits FG1, FG2 or the two valid identifiers, i.e., both valid flags must be OK.

The integrity combination IK of the data concerning the integrity IMW1, IMW2 of the provisional measured values MW1, MW2 may in some cases be a logical AND, for example valid identifiers, i.e., so-called flags, but in general it may be any combination of independent data concerning the integrity IMW1, IMW2 of the provisional measured values MW1, MW2, which makes a more reliable integrity assessment possible, for example a union of sets of the error upper limits FG1, FG2 of both measuring methods MV1, MV2.

The integrity is in particular a reliable measure of how good the respective measured value MW1, MW2, KMW is, for example whether at the moment the measured value MW1, MW2, KMW can be relied upon, whether it can be ruled out that an error of the measured value MW1, MW2, KMW at the moment is not greater than a defined value. The integrity is a guarantee for the quality of the measured value MW1, MW2, KMW, for example a Yes/No flag or an indication that the measured value MW1, MW2, KMW is only guaranteed in a certain range, for example a required quality for a distance value is only guaranteed in a range up to 30 m.

FIG. 3 shows, for the example of vehicle localization, results EMV1, EMV2 of the two different measuring methods MV1, MV2 and the combined result EF. The first measuring method MV1 supplies a first vehicle position FP1 as localization result and a first error upper limit FG1. It is guaranteed that the first vehicle position FP1 is in this range, with a false-positive error rate of less than a required value. The second measuring method MV2 supplies a second vehicle position FP2 as localization result and a second error upper limit FG2. It is guaranteed that the second vehicle position FP2 is in this range, with a false-positive error rate of less than a required value. A cut-set of the two error upper limits FG1, FG2 corresponds to the information on the integrity KIMW of the combined measured values KMW.

The assessment of the information on the integrity KIMW of the combined measured values KMW is only positive when all secondary conditions introduced by the data concerning the integrity IMW1, IMW2 of the determined provisional measured values MW1, MW2 are fulfilled. If, for example, both data concerning the integrity IMW1, IMW2 of the determined provisional measured values MW1, MW2 contain maximum error estimates, i.e., maximum error upper limits, only the larger error overhang fulfils both restrictions. Of two quality assessments, only the poorer one is taken into account, i.e., with a good and a medium quality assessment, only the medium assessment is taken into account. Two valid flags, i.e., valid identifiers, are only assessed as positive if both are true, i.e., positive. A false-positive integrity assessment means that the data quality of the integrity data is assessed as better than it actually is.

To summarize, it may be said that the information on the integrity KIMW of the combined measured values KMW makes a more reliable assessment of the integrity possible, i.e., a lower false-positive error rate, as it only leads to a false positive when both individual data concerning the integrity IMW1, IMW2 of the determined provisional measured values MW1, MW2 are false-positive simultaneously. However, the assessment is also much more likely to be negative, so that the measuring method MV1, MV2 that is currently weaker in performance always limits the availability.

The only way known from the prior art for increasing the availability is to add more redundant partial components, i.e., more different measuring methods MV1, MV2, MV3, and perform a best selection BA, for example with three measuring methods MV1, MV2, MV3 the best two of the three measuring methods MV1, MV2, MV3, as shown in FIG. 4. Here, three different measuring methods MV1, MV2, MV3 are used. The best selection BA of two of the three measuring methods MV1, MV2, MV3 is carried out, followed by the hard linking step HVS shown in FIG. 2 and described above. The results EF obtained, in particular combined measured values KMW, are then supplied to the further processing device 1. However, this increases the system costs considerably, as more measuring methods MV1, MV2, MV3 and corresponding necessary measuring devices are required, and is therefore only carried out when high availability is very critical, i.e., is required for example in object recognition.

As an improvement of the solution known from the prior art, the method already described above and shown in FIG. 5 for determining measured values MW1, MW2, KMW by means of at least two different measuring methods MV1, MV2 envisages an extension of the two-component decomposition known from the prior art, which maximizes the system availability in an intelligent manner within the permissible design range. This makes use of the fact that with the combination of the integrity data, i.e., with the information on the integrity KIMW of the combined measured values KMW, the false-positive error rate of the integrity assessment as a rule becomes so low that it exceeds the actual system requirement. Therefore, a budget with a basically error-free operating time will be accumulated, so long as the integrity data, i.e., the data concerning the integrity IMW1, IMW2 of the determined provisional measured values MW1, MW2 of both partial components, i.e., both measuring methods MV1, MV2, are good enough. This budget can then be used to allow short intervals, in which only one partial component, i.e., only one of the two different measuring methods MV1, MV2, supplies the result EMV1, EMV2 for the further processing device 1, in order to bridge over some time when the other partial component, i.e., the other measuring method MV2, MV1, does not operate well enough. During this short interval, the false-positive error rate is higher, but a monitoring unit 2 controls the time shares both of the excessively safe and of the less safe operating time, so that the preset false-positive error rate continues to be maintained.

The method comprises the procedure shown in FIG. 2 and already described above. The two different measuring methods MV1, MV2 supply in each case provisional measured values MW1, MW2, data concerning the integrity IMW1, IMW2 of the provisional measured values MW1, MW2 and a respective standard deviation SA1, SA2. This takes place, for example, by means of an estimation algorithm. The data concerning the integrity IMW1, IMW2 of the provisional measured values MW1, MW2 comprise, for example, the error upper limit or a valid identifier, i.e., valid flag, and therefore a guaranteed upper limit of the error of the respective provisional measured value MW1, MW2.

The measured value fusion MF takes place in the hard linking step HVS, i.e., the provisional measured values MW1, MW2 supplied by the two different measuring methods MV1, MV2 are merged to form combined measured values KMW with the combined standard deviation KSA. The combined measured value KMW is, for example, a weighted mean value, weighted, for example, according to standard deviation SA1, SA2. The integrity combination IK of the data concerning the integrity IMW1, IMW2 of the provisional measured values MW1, MW2 supplies the information on the integrity KIMW of the combined measured values KMW, for example the union of sets of the two error upper limits FG1, FG2 or the two valid identifiers, i.e., both valid flags, must be OK.

The integrity combination IK of the data concerning the integrity IMW1, IMW2 of the provisional measured values MW1, MW2 may in some cases be a logical AND, for example valid identifiers, i.e., so-called flags, but in general it may be any combination of independent data concerning the integrity IMW1, IMW2 of the provisional measured values MW1, MW2 that makes a safer integrity assessment possible, for example a union of sets of the error upper limits FG1, FG2 of the two measuring methods MV1, MV2.

The integrity is, in particular, a reliable measure of how good the respective measured value MW1, MW2, KMW is, for example whether at the moment the measured value MW1, MW2, KMW can be relied upon, whether it can be ruled out that an error of the measured value MW1, MW2, KMW at the moment is not greater than a defined value.

The integrity is a guarantee for the quality of the measured value MW1, MW2, KMW, for example a Yes/No flag or an indication that the measured value MW1, MW2, KMW is only guaranteed in a certain range, for example a required quality for a distance value is only guaranteed in a range up to 30 m.

In addition, a soft linking step WVS takes place. This comprises a multiplexer 3, which receives the combined measured values KMW, the combined standard deviation KSA, the information on the integrity KIMW of the combined measured values KMW and, from the two measuring methods MV1, MV2, the provisional measured values MW1, MW2, data concerning the integrity IMW1, IMW2 of the provisional measured values MW1, MW2, and the respective standard deviation SA1, SA2. Moreover, it receives a control signal SS of the monitoring unit 2, which tells the multiplexer 3 which values it should output in each case for further processing, the fused values, i.e., the combined measured values KMW, the combined standard deviation KSA and the information on the integrity KIMW of the combined measured values KMW, or the values of the first measuring method MV1, i.e., its provisional measured values MW1, standard deviation SA1, and data concerning the integrity IMW1 of the determined provisional measured values MW1, or the values of the second measuring method MV2, i.e., its provisional measured values MW2, standard deviation SA2, and data concerning the integrity IMW2 of the determined provisional measured values MW2. For this purpose, in the monitoring unit 2 there takes place the integrity test IP of the information on the integrity KIMW of the combined measured values KMW, the data concerning the integrity IMW1 of the determined provisional measured values MW1 of the first measuring method MV1, and the data concerning the integrity IMW2 of the determined provisional measured values MW2 of the second measuring method MV2. Moreover, counters Z0, Z1, Z2 are running, which record a period of time of the provision of the respective values for further processing, i.e., a counter Z0 is running if the fused values, i.e., the combined measured values KMW, the combined standard deviation KSA, and the information on the integrity KIMW of the combined measured values KMW are supplied for further processing by the multiplexer 3 and/or indicates how long they are supplied, a counter Z1 is running if the values of the first measuring method MV1, i.e., its provisional measured values MW1, standard deviation SA1 and data concerning the integrity IMW1 of the determined provisional measured values MW1 are supplied for further processing by the multiplexer 3 and/or indicates how long they are supplied, and a counter Z2 is running if the values of the second measuring method MV2, i.e., its provisional measured values MW2, standard deviation SA2, and data concerning the integrity IMW2 of the determined provisional measured values MW2 are supplied for further processing by the multiplexer 3 and/or indicates for how long they are supplied. The periods of time determined thereby for supply of the respective values for further processing flow into the monitoring unit 2, so that the supply, in particular, of the values of the first measuring method MV1 and second measuring method MV2 is limited by the monitoring unit 2. Counter Z0 indicates how long the supply of the values for further processing takes place with a very small error rate, in particular false-positive error rate.

Moreover, a preset configuration K flows into the monitoring unit 2, for example maximum time shares max_time_share_1, max_time_share_2 of the first and second measuring method MV1, MV2 and a minimum continuity min_continuity.

We then have:

$$\text{max\_time\_share\_1} = (FP_S - FP_C)/(FP_1 - FP_C) \tag{1}$$

$$\text{max\_time\_share\_2} = (FP_S - FP_C)/(FP_2 - FP_C) \tag{2}$$

with:
$FP_1$: false-positive error rate of the data concerning the integrity IMW1 of the determined provisional measured values MW1 of the first measuring method MV1,
$FP_2$: false-positive error rate of the data concerning the integrity IMW2 of the determined provisional measured values MW2 of the second measuring method MV2,
$FP_C$: false-positive error rate of the information on the integrity KIMW of the combined measured values KMW,
$FP_S$: desired false-positive error rate of the information on the integrity IMW1, IMW2, KIMW supplied in each case by the multiplexer 3.

The minimum continuity min_continuity is the minimum period of time or distance in which the control by the monitoring unit 2 can remain in a mode with a single source, in particular with a single measuring method MV1, MV2, without having to switch back. Advantageously, it is set so that it covers typical lengths of the unavailability of the combined integrity data, i.e., of the information on the integrity KIMW of the combined measured values KMW.

The basic idea is that if both measuring methods MV1, MV2 have supplied better results EMV1, EMV2 than required, a budget is built up, which may then be degraded, i.e., if both measuring methods MV1, MV2 were better than required over a specified period of time, results EMV1, EMV2, in particular provisional measured values MW1, MW2, that are poorer than required may also be used temporarily. Over a longer period, the required accuracy will nevertheless be achieved.

FIG. 6 shows a status S1, S2, SF of supply of the results EMV1, EMV2 of the respective measuring method MV1, MV2 or of the fused, i.e., combined, results EF by the multiplexer 3 for further processing. After a start S, first all counters Z0, Z1, Z2 are reset and it is first switched to the status SF for supply of the combined results EF. A choice device A is set to supply of the combined results EF. Counter Z0 is incremented.

If a condition K1a and a condition K1b apply, it is switched to the status S1 of supply of the results EMV1 of the first measuring method MV1, its choice device A is set to supply of the results EMV1 of the first measuring method MV1 and the counter Z1 is incremented. If the condition Kia no longer applies, it is switched back to the status SF of supply of the combined results EF.

If a condition K2a and a condition K2b apply, it is switched to the status S2 of supply of the results EMV2 of the second measuring method MV2, its choice device A is set to supply of the results EMV2 of the second measuring method MV2 and the counter Z2 is incremented. If the condition K2a no longer applies, it is switched back to the status SF of supply of the combined results EF.

Condition 1a applies if the information on the integrity KIMW of the combined measured values KMW is inadequate, the data concerning an integrity IMW1 of the determined provisional measured values MW1 of the first measuring method MV1 are adequate, the data concerning an integrity IMW2 of the determined provisional measured values MW2 of the second measuring method MV2 are inadequate and the quotient of counter Z1 and the total of the three counters Z0, Z1, Z2 is smaller than the maximum time share max_time_share_1 of the first measuring method MV1.

Condition 1b applies if the quotient of the total of counter Z1 and the minimum continuity min_continuity and the total of all three counters Z0, Z1, Z2 is smaller than the maximum time share max_time_share_1 of the first measuring method MV1.

Condition 2a applies if the information on the integrity KIMW of the combined measured values KMW is inadequate, the data concerning an integrity IMW1 of the determined provisional measured values MW1 of the first measuring method MV1 are inadequate, the data concerning an integrity IMW2 of the determined provisional measured values MW2 of the second measuring method MV2 are adequate and the quotient of counter Z2 and the total of the three counters Z0, Z1, Z2 is smaller than the maximum time share max_time_share_2 of the second measuring method MV1.

Condition 2b applies if the quotient of the total of counter Z2 and the minimum continuity min_continuity and the total of all three counters Z0, Z1, Z2 is smaller than the maximum time share max_time_share_2 of the first measuring method MV2.

In a further embodiment of the method, more than two different measuring methods MV1, MV2 may be used. The measured value fusion MF, the monitoring unit 2 and the multiplexer 3 receive additional input values as a result. An additional counter and an additional status are required per additional measuring method MV3. The necessary modifications are easy to implement.

In a further embodiment, as shown in FIG. 7, a supply cascade with various error rates may be provided. In some systems, different further processing devices 1a, 1b, 1c have different requirements on the error rate, in particular the false-positive error rate. The method may then be carried out in parallel by using various entities with different configurations K1, K2, K3. Then each further processing device 1a, 1b, 1c receives its own tailored variant of the measurement with the maximum possible availability. This embodiment is also orthogonal and combinable with the preceding embodiment.

FIG. 7 shows the two measuring methods MV1, MV2, three further processing devices 1a, 1b, 1c and a configuration K1 with high safety for the first further processing device 1a, a balanced configuration K2 for the second further processing device 1b and a configuration K3 with greater availability for the third further processing device 1c. The soft linking step WVS is then carried out for the respective further processing device 1a, 1b, 1c corresponding to the respective configuration K1, K2, K3.

The advantages of the method described here relative to the prior art are that the false-positive error rate of the integrity assessments are adapted to the actual requirements of the further processing device 1, so that the optimum availability is achieved for these requirements on the false-positive error rate. Various further processing devices 1a, 1b, 1c may be provided with dedicated variants of the measured values MW1, MW2, KMW, which in each case are tuned optimally to compromises between safety and availability. The increases in availability are transmitted via the function chains of the system and therefore also reach end user functions, wherein the increase in availability improves the user experience of the end user functions directly. The development and conversion of the method becomes simpler, as available solutions can easily be newly scaled, in order to meet the requirements with respect to safety or availability. This makes a reduction in development costs possible.

Use of the method for localization of a vehicle for implementing automated or autonomous driving is described in the following, referring to FIGS. 8 to 10. The safety-critical system is then an automated, in particular highly automated, or autonomous driving function. The measuring methods MV1, MV2 determine the position of the vehicle on a high-resolution digital map, which supplies decisive environmental data for the automated, in particular highly automated, or autonomous driving function. The measured values MW1, MW2, KMW and standard deviations SA1, SA2, KSA are vehicle positions PLM, PGNSS, PK and the uncertainties thereof on the high-resolution digital map. The integrity data, i.e., the data concerning the integrity IMW1, IMW2 of the determined provisional measured values MW1, MW2 and the combined measured values KMW, are a live calculation of the maximum position error in meters, as a limiting frame around the vehicle, wherein it is guaranteed that the actual position of the vehicle lies therein. This is designated as the error upper limit.

The integrity data, i.e., the data concerning the integrity IMW1, IMW2 of the determined provisional measured values MW1, MW2 and the combined measured values KMW, are considered adequate so long as the error upper limit is below a so-called alarm limit of 10 m.

The integrity data, i.e., the data concerning the integrity IMW1, IMW2 of the determined provisional measured values MW1, MW2 and the combined measured values KMW, are false-positive if a current positioning error exceeds the error upper limit.

If the integrity data, i.e., the data concerning the integrity IMW1, IMW2 of the determined provisional measured values MW1, MW2 and the combined measured values KMW, are inadequate, the automated, in particular highly automated, or autonomous driving function will switch to a safe deactivation status or remain there and will inform the user about the unavailability. The user experience is higher, the higher the availability is.

Let us assume that the required false-positive error rate is <=1e-6/km and a required ASIL classification is "C". This is only attainable with difficulty with an individual cost-effective localization method. This is therefore implemented with two different measuring methods MV1, MV2.

The first measuring method MV1 is a satellite-supported measuring method, in particular based on at least one global navigation satellite system, also designated as GNSS-based measuring method, with ASIL classification A (C), which achieves a false-positive error rate of <=1e-5/km at a length of the false-positive status of less than 100 m, i.e., the state of at most one error per 100000 km persists for the next 100 m.

The second measuring method MV2 is a landmark-based measuring method with the ASIL classification BI, which achieves a false-positive error rate of <=1e-4/km at a length of the false-positive status of less than 200 m, i.e., the state of at most one error per 10000 km persists for the next 200 m.

For a false-positive rate of the combined integrity status, the error statuses of the two measuring methods MV1, MV2 must overlap. With the two measuring methods MV1, MV2 independent of one another, this is very unlikely. The combined false-positive error rate is then less than 1 e-10/km.

However, the combination requires that the error upper limits are standardized in a larger limiting frame. The standardized limiting frame far exceeds the alarm limit, so that the integrity data, i.e., the data on the integrity KIMW of the combined measured values KMW are inadequate for the system of the automated, in particular highly automated, or autonomous driving function. This results in a greater unavailability of the automated, in particular highly automated, or autonomous driving function.

FIG. 8 shows the vehicle position PLM determined by means of the landmark-based measuring method and its error upper limit PLLM, the vehicle position PLGNSS determined by means of the satellite-supported measuring method, in particular based on at least one global navigation satellite system, and its error upper limit PLGNSS, and the vehicle position PK determined from the combined measured values KMW, and its error upper limit PLK.

The error upper limit PLGNSS of the satellite-supported measuring method, in particular based on at least one global navigation satellite system, exceeds the alarm limit of 10 m for 4% of the trip. The error upper limit PLLM of the landmark-based measuring method exceeds the alarm limit of 10 m for 8% of the trip. The error upper limit PLK of the vehicle position PK determined from the combined measured values KMW exceeds the alarm limit of 10 m and therefore for more than 12% of the trip, as the differences between the determined vehicle positions PLM, PGNSS before merging as a rule add an additional margin to the combined error upper limit PLK. That is, the automated, in particular highly automated, or autonomous driving function is unavailable for 12% of the time. If, however, it is available, the localization result is safer than required. There is thus a high unavailability of the automated, in particular highly automated, or autonomous driving function and therefore low user satisfaction.

When using the method described here with the soft linking step WVS, with:

$$FP_S = 1e\text{-}6/\text{km}$$
$$FP_C = 1e\text{-}10/\text{km}$$
$$FP_1 = 1e\text{-}5/\text{km}$$
$$FP_2 = 1e\text{-}4/\text{km}$$

and with equations (1) and (2), we get the following values for the maximum time shares max_time_share_1, max_time_share_2 of the measuring methods MV1, MV2:

$$\text{max\_time\_share\_1} = (FP_S - FP_C)/(FP_1 - FP_C) = 0.09999 \approx 0.1 \quad (3)$$

$$\text{max\_time\_share\_2} = (FP_S - FP_C)/(FP_2 - FP_C) = 0.009999 \approx 0.01 \quad (4)$$

The minimum continuity min_continuity could be about 1000 m, where it can be safely assumed that new landmarks or satellites are detected, to make restoration of integrity possible.

FIG. 9 shows the two measuring methods MV1, i.e., the first measuring method as a satellite-supported measuring method, in particular based on at least one global navigation satellite system, and the second measuring method MV2 as a landmark-based measuring method, with their false-positive error rates given above and implementing of the method described with the soft linking step WVS and the resultant false-positive error rate given above and the further processing device 1 in the form of the system for the automated, in particular highly automated, or autonomous driving function. The configuration K comprises the maximum time share max_time_share_1 of the first measuring method MV1 of 0.1, as calculated in equation (3), the maximum time share max_time_share_2 of the second measuring method MV2 of 0.01, as calculated in equation (4), and the minimum continuity min_continuity of 1000, as given above.

This produces the effect that 88% of the time, the fused, i.e., combined, results EF, in particular the combined measured values KMW, can be used. The automated, in particular highly automated, or autonomous driving function is available. During the inadequate integrity IMW1 of the determined provisional measured values MW1 of the first measuring method MV1, the availability can be maintained, until the maximum time share max_time_share_2 of the second measuring method MV2 is reached, up to 1% availability. During the inadequate integrity IMW2 of the determined provisional measured values MW2 of the second measuring method MV2, the availability can be maintained, until the maximum time share max_time_share_1 of the first measuring method MV1 is reached, up to 8% availability. As this maximum time share max_time_share_1 of the first measuring method MV1 is barely reached, the availability can largely be maintained. There are possibly some restrictions in practice, but it may be assumed that the initial unavailability of 12% is reduced by approx. ½ to ⅓.

FIG. 10 shows an embodiment of the method with two different further processing devices 1a, 1b with different safety requirements, which use position determination, wherein in this case the further processing device 1a is the system for the automated, in particular highly automated, or autonomous driving function and the further processing device 1b is a system for a comfort function and the measuring methods MV1, MV2, as in FIG. 9, are the satellite-supported measuring method, in particular based on at least one global navigation satellite system, MV1, and the landmark-based measuring method MV2. The further processing device 1b, as a system for a comfort function, has lower safety requirements. For example, its false-positive error rate is 1 e-5/h.

Here, for each further processing device 1a, 1 b, there is parallel execution of the soft linking step WVS with different configurations K1, K2, for the further processing device 1a of the system for the automated, in particular highly automated, or autonomous driving function again with the maximum time share max_time_share_1 of the first measuring method MV1 of 0.1, as calculated in equation (3), the maximum time share max_time_share_2 of the second measuring method MV2 of 0.01, as calculated in equation (4), and with the minimum continuity min_continuity of 1000, as given above, and for the further processing device 1b of the system for the comfort function with the maximum time share max_time_share_1 of the first measuring method MV1 of 1, the maximum time share max_time_share_2 of the second measuring method MV2 of 0.1 and with the minimum continuity min_continuity of 1000.

The false-positive error rate of the first measuring method MV1 is 1 e-5/km, the false-positive error rate of the second measuring method MV2 is 1 e-4/km, the false-positive error rate of the soft linking step WVS for the further processing device 1a of the system for the automated, in particular highly automated, or autonomous driving function is 1 e-6/km and the false-positive error rate of the soft linking step WVS for the further processing device 1b of the system of the comfort function is 1 e-5/km.

The resultant availability is greater than 99%, while the individual preset safety requirements are met.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method, comprising:
   determining a first measured value by a first measuring method;
   determining a second measured value by a second measuring method;
   determining for each of the first and second measured values first and second provisional measured values, respectively;
   receiving first and second data for integrity of the first and second determined provisional measured values, respectively;
   merging the first and second provisional measured values to produce a combined measured value and information on an integrity of the combined measured value;
   selecting at least one of the first provisional measured value, second provisional measured value, and the combined measured value for further processing based on
      the first data for integrity, the second data for integrity, and the integrity of the combined measured value, and
      a period of time during which the first provisional measured value, second provisional measured value, and the combined measured value respectively meet specified integrity requirements.

2. The method of claim 1, wherein, depending upon the selection of the at least one of the first provisional measured value, second provisional measured value, and the combined measured value,
   the combined measured value is supplied for the further processing, or
   one of the first and second measuring methods is selected and the determined provisional measured value of the selected measuring method is supplied for the further processing.

3. The method of claim 1, further comprising:
   determining a period of time to supply the selected at least one of the first provisional measured value, second provisional measured value, and the combined measured value.

4. The method of claim 3, wherein the period of time is limited.

5. The method of claim 1, wherein the at least one of the first provisional measured value, second provisional measured value, and the combined measured value is selected for a majority of further processing devices as a function of the first data for integrity, the second data for integrity, or the integrity of the combined measured value, respectively, and depending on a period of time during which the first provisional measured value, second provisional measured value, and the combined measured value respectively satisfy specific integrity requirements.

6. The method of claim 1, wherein the first data for integrity, the second data for integrity, or the integrity of the combined measured value are measures of quality of a reliability of a respective one of the first provisional measured value, the second provisional measured value, and the combined measured value.

7. The method of claim 1, wherein the first and second measuring methods respectively comprise a landmark-based measuring method and a satellite-supported measuring method based on at least one global navigation satellite system.

8. The method of claim 1, wherein the first and second measuring methods comprise at least two different measuring methods for object recognition or distance determination, wherein the at least two different measuring methods comprise at least one radar-based measuring method, at least one lidar-based measuring method, and/or at least one camera-based measuring method.

9. A method, comprising:
   determining, by a vehicle, a first measured value by a first measuring method;
   determining, by the vehicle, a second measured value by a second measuring method;
   determining, by the vehicle, for each of the first and second measured values first and second provisional measured values, respectively;
   receiving first and second data for integrity of the first and second determined provisional measured values, respectively;
   merging, by the vehicle, the first and second provisional measured values to produce a combined measured value and information on an integrity of the combined measured value;
   selecting, by the vehicle, at least one of the first provisional measured value, second provisional measured value, and the combined measured value based on
      the first data for integrity, the second data for integrity, and the integrity of the combined measured value, and
      a period of time during which the first provisional measured value, second provisional measured value, and the combined measured value respectively meet specified integrity requirements;
   determining whether to maintain or initiate an autonomous driving mode of the vehicle based on the selected one of the first provisional measured value, second provisional measured value, and the combined measured value; and
   using the selected one of the first provisional measured value, second provisional measured value, and the combined measured value in the autonomous driving mode.

10. The method of claim 9, wherein, depending upon the selection of the at least one of the first provisional measured value, second provisional measured value, and the combined measured value, the combined measured value is supplied for the further processing, or one of the first and second measuring methods is selected and the determined provisional measured value of the selected measuring method is supplied for the further processing.

11. The method of claim 9, further comprising:

determining a period of time to supply the selected at least one of the first provisional measured value, second provisional measured value, and the combined measured value.

12. The method of claim 9, wherein the first data for integrity, the second data for integrity, or the integrity of the combined measured value are measures of quality of a reliability of a respective one of the first provisional measured value, the second provisional measured value, and the combined measured value.

13. The method of claim 9, wherein the first and second measuring methods respectively comprise a landmark-based measuring method and a satellite-supported measuring method based on at least one global navigation satellite system.

14. The method of claim 9, wherein the first and second measuring methods comprise at least two different measuring methods for object recognition or distance determination, wherein the at least two different measuring methods comprise at least one radar-based measuring method, at least one lidar-based measuring method, and/or at least one camera-based measuring method.

15. A method, comprising:

determining a first measured value of a position of a vehicle by a first measuring method;

determining a second measured value of the position of the vehicle by a second measuring method;

determining, for each of the first and second measured values of the position of the vehicle, first and second provisional measured values of the position of the vehicle, respectively;

receiving first and second data for integrity of the first and second determined provisional measured values of the position of the vehicle, respectively;

merging the first and second provisional measured values of the position of the vehicle to produce a combined measured value of the position of the vehicle and information on an integrity of the combined measured value of the position of the vehicle;

selecting at least one of the first provisional measured value of the position of the vehicle, second provisional measured value of the position of the vehicle, and the combined measured value of the position of the vehicle for further processing based on the first data for integrity, the second data for integrity, and the integrity of the combined measured value, and a period of time during which the first provisional measured value of the position of the vehicle, second provisional measured value of the position of the vehicle, and the combined measured value of the position of the vehicle respectively meet specified integrity requirements.

16. The method of claim 15, further comprising:

determining whether to maintain or initiate an autonomous driving mode of the vehicle based on the selected one of the first provisional measured value of the position of the vehicle, second provisional measured value of the position of the vehicle, and the combined measured value of the position of the vehicle; and using the selected one of the first provisional measured value of the position of the vehicle, second provisional measured value of the position of the vehicle, and the combined measured value of the position of the vehicle in the autonomous driving mode.

17. The method of claim 15, wherein the first and second measuring methods respectively comprise a landmark-based measuring method and a satellite-supported measuring method based on at least one global navigation satellite system.

18. The method of claim 15, wherein the first and second measuring methods comprise at least two different measuring methods for object recognition or distance determination, wherein the at least two different measuring methods comprise at least one radar-based measuring method, at least one lidar-based measuring method, or at least one camera-based measuring method.

19. The method of claim 15, wherein the at least one of the first provisional measured value of the position of the vehicle, second provisional measured value of the position of the vehicle, and the combined measured value of the position of the vehicle is selected for a majority of further processing devices as a function of the first data for integrity, the second data for integrity, or the integrity of the combined measured value, respectively, and depending on a period of time during which the first provisional measured value of the position of the vehicle, second provisional measured value of the position of the vehicle, and the combined measured value of the position of the vehicle respectively satisfy specific integrity requirements.

* * * * *